United States Patent [19]
Berndt

[11] Patent Number: 5,870,200
[45] Date of Patent: Feb. 9, 1999

[54] APPARATUS FOR DETERMINING THE THICKNESS OF AN OPTICAL SAMPLE

[75] Inventor: Klaus W. Berndt, Timonium, Md.

[73] Assignee: Becton Dickinson and Company, Franklin Lakes, N.J.

[*] Notice: The term of this patent shall not extend beyond the expiration date of Pat. No. 5,781,303.

[21] Appl. No.: 920,487

[22] Filed: Aug. 29, 1997

[51] Int. Cl.$^6$ .................................................. G01B 10/06
[52] U.S. Cl. .......................... 356/382; 356/244; 359/396
[58] Field of Search ..................................... 356/244, 246, 356/381–382; 359/396–398; 250/201.3, 201.4

[56] References Cited

U.S. PATENT DOCUMENTS

| | | | |
|---|---|---|---|
| 5,202,740 | 4/1993 | Kivits | 356/382 |
| 5,696,589 | 12/1997 | Bernacki | 356/381 |

FOREIGN PATENT DOCUMENTS

| | | | |
|---|---|---|---|
| 61-017905 | 1/1986 | Japan | 356/381 |

*Primary Examiner*—Robert Kim
*Attorney, Agent, or Firm*—Bruce S. Weintraub

[57] ABSTRACT

The present invention relates to the field of quantitative microspectroscopy, and in particular to an apparatus for determining the exact thickness of an optical microscopic sample at the time an absorbance measurement or other spectroscopic measurements are performed on this sample. This apparatus can be an optical microscope comprising a means for containing a sample wherein said means has first and second optical markers; a means for holding said means for containing a sample; a means for illuminating the sample in said means for containing a sample; a means for automatically focusing on first and second optical markers in said means for containing a sample; and a means for performing a pattern recognition procedure for said optical samples, wherein said means comprises an imaging receiver which is connected to an image processor and a computer.

10 Claims, 3 Drawing Sheets

APPARATUS FOR DETERMINING THE THICKNESS OF AN OPTICAL SAMPLE

FIELD OF THE INVENTION

The present invention relates to the field of quantitative microspectroscopy, and in particular to an apparatus for determining the exact thickness of an optical microscopic sample.

BACKGROUND OF THE INVENTION

In many areas of science and technology, there exists a need to determine the concentration of chemical substances in small samples. One method for determining the concentration of a substance is quantitative microspectroscopy. In this case one measures the optical absorbance, $A(\lambda,c)$, which is related to the concentration, c, via the simple equation (1):

$$A(\lambda,c) = a(\lambda)cz \qquad (1)$$

where $\lambda$ is the optical wavelength, $a(\lambda)$ is the wavelength-dependent absorption coefficient, and z is the sample thickness.

The error in determining the concentration is given by equation (2):

$$dc = \left(\frac{dc}{dA}\right)dA + \left(\frac{dc}{da}\right)da + \left(\frac{dc}{dz}\right)dz. \qquad (2)$$

The error in the absorbance measurement can be kept extremely low, using modern optoelectronics and electronics equipment. For a given substance, the absorption coefficient, $a(\lambda)$, can be determined precisely in advance by using large samples with a thickness in the range 1 mm to 10 mm. Consequently, the error in determining the concentration, c, in small samples having a thickness in the sub-mm range is dominated by the error in measuring the sample thickness, and is given by equation (3):

$$\frac{dc}{c} = \frac{dz}{z}. \qquad (3)$$

From equation (3) it follows that determining the concentration of a chemical substance within a 10 $\mu$m thick microsample with an accuracy of 1% would require knowledge of the sample thickness with an accuracy of 1%, i.e. with an accuracy of 100 nm.

Producing microsample containers with a precision in the sample thickness of 100 nm might be possible, but is expected to be cost-intensive. Moreover, such microsample containers are likely to deform over their shelf life during storage, or to deform due to sample loading. It is apparent that it is practical to determine the exact sample thickness at the time of usage, after loading the sample into the container. Consequently, there exists a need for a method and apparatus for precisely determining the thickness of thin optical samples.

SUMMARY OF THE INVENTION

It is an objective of the present invention to provide a method and apparatus for precisely determining the thickness of optical samples at the time an absorbance measurement or other spectroscopic measurements are performed on this sample.

According to the present invention, the above objective is achieved by providing a sample container comprising a first and a second optically transparent window, whereby the inner surface of the first window has first optical markers, and the inner surface of the second window has second optical markers, the sample container is loaded into an optical microscope, the sample container is moved until one of the first optical markers has been identified and located within the field of view, the sample is then moved until the first optical marker is exactly in-focus, the first in-focus position is recorded, then the sample container is moved until one of the second optical markers has been identified and located within the field of view, the sample is moved until the second optical marker is exactly in-focus, the second in-focus position is recorded, and finally, the difference between the first and the second in-focus positions is calculated, which can be used to determine the sample thickness by taking into account the index of refraction of the sample.

In a preferred embodiment of the invention, the microscope is equipped with an imaging receiver which is connected to an image processor and a computer that perform a pattern recognition procedure. The microscope sample stage is connected to a stage controller and the computer that allow for an auto-focus procedure. In this way, the whole sample thickness determination can be performed as an automated procedure. For the purpose of identification and differentiation, the first and the second optical markers are different. It is advantageous if the markers are disposed in a regular pattern across the whole window area. Many different shapes of markers are possible and within the scope of the invention. The markers can be of limited size such as squares and triangles, but can also be of unlimited size such as lines, square-waves, or other "wave forms". Furthermore, different types of markers, based on absorption, reflection, scattering or other optical effects can be employed and would still be within the scope of the invention.

DETAILED DESCRIPTION OF THE INVENTION

The present invention is directed, in one embodiment, to a method for precisely determining the thickness of optical samples at the time an absorbance measurement or other spectroscopic measurements are performed on said sample(s), comprising:

a) providing a sample container comprising a first and a second optically transparent window, whereby the inner surface of the first window has first optical markers, and the inner surface of the second window has second optical markers;

b) depositing an optical sample into the sample container;

c) loading the sample container into an optical microscope;

d) moving the sample container until one of the first optical markers is identified and located within the field of view, and then moving the sample until the first optical marker is exactly in-focus, and recording the first in-focus position;

e) then moving the sample container until one of the second optical markers is identified and located within the field of view, and moving the sample until the second optical marker is exactly in-focus, and recording the second in-focus position;

f) calculating the difference between the first and the second in-focus positions; and g) determining the thickness of the optical sample.

In another embodiment, the present invention relates to an apparatus for precisely determining the thickness of optical samples at the time an absorbance measurement or other spectroscopic measurements are performed on said sample(s), wherein said apparatus is an optical microscope comprising:

a means for containing a sample wherein said means has first and second optical markers;

a means for holding said means for containing a sample;

a means for illuminating the sample in said means for containing a sample;

a means for automatically focusing on first and second optical markers in said means for containing a sample; and a means for performing a pattern recognition procedure for said optical samples, wherein said means comprises an imaging receiver which is connected to an image processor and a computer.

Figure 1:
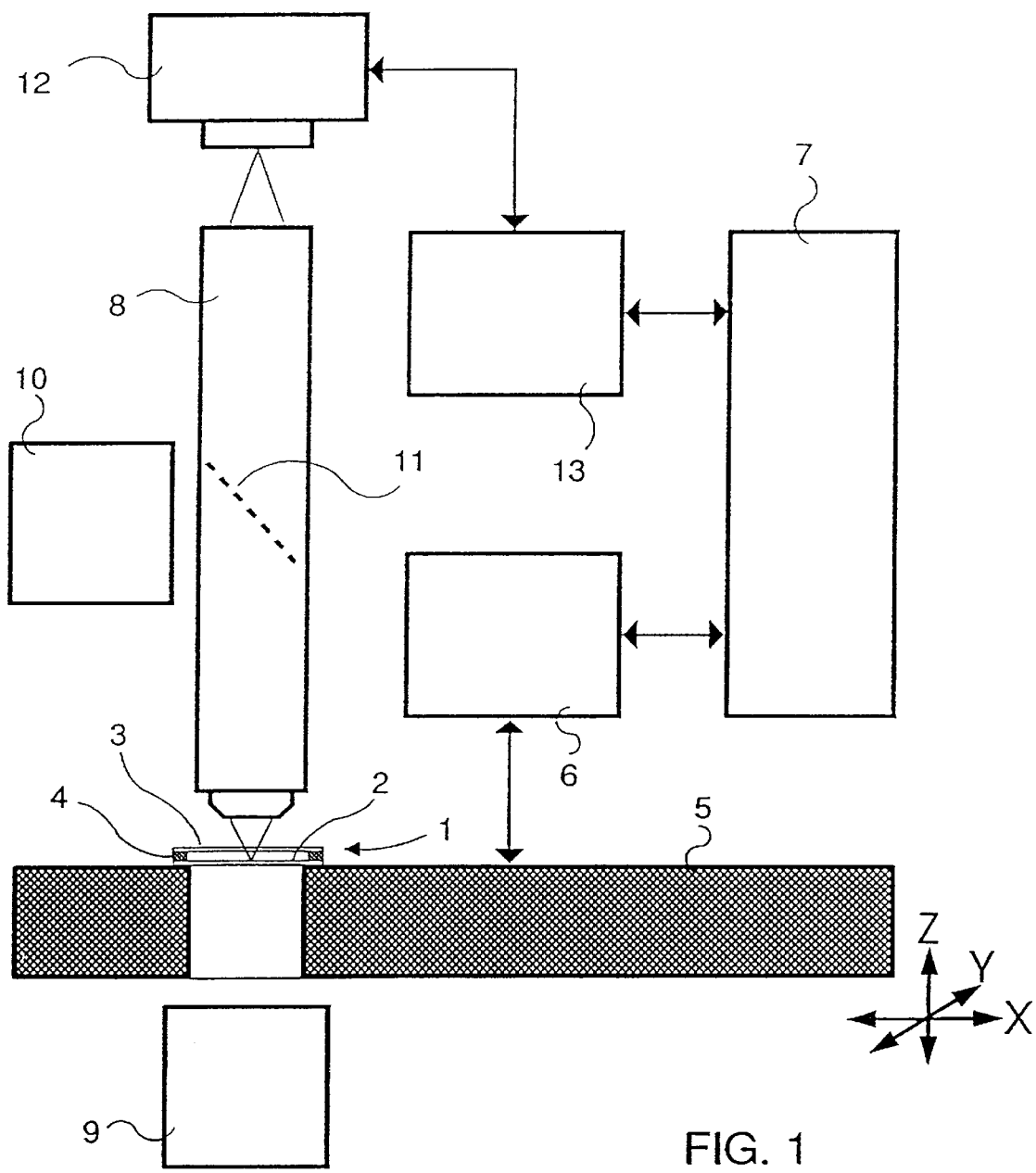
FIG. 1 shows schematically a microspectroscopic apparatus according to the present invention.

According to the present invention, and as illustrated in FIG. 1, a sample container 1 for deposition of a sample is provided, comprising a first optically transparent window 2 and a second optically transparent window 3, whereby the two windows are separated by a wall 4 that determines the thickness of an optical sample located between windows 2 and 3. The inner surface of the first window 2 has first optical markers, and the inner surface of the second window 3 has second optical markers.

For the purpose of identification and differentiation, the first and second optical markers are different. It is advantageous if the markers are disposed in a regular pattern across the whole window area. Many different shapes of markers are possible and within the scope of the invention. The markers can be of limited size such as squares and triangles, but can also be of unlimited size such as lines, square-waves, or other "wave forms". Furthermore, different types of markers, based on absorption, reflection, scattering or other optical effects can be employed and would still be within the scope of the invention. In order to generate optical markers, different technologies that are common to the semiconductor industry and in micromachining can be applied.

Figure 2:
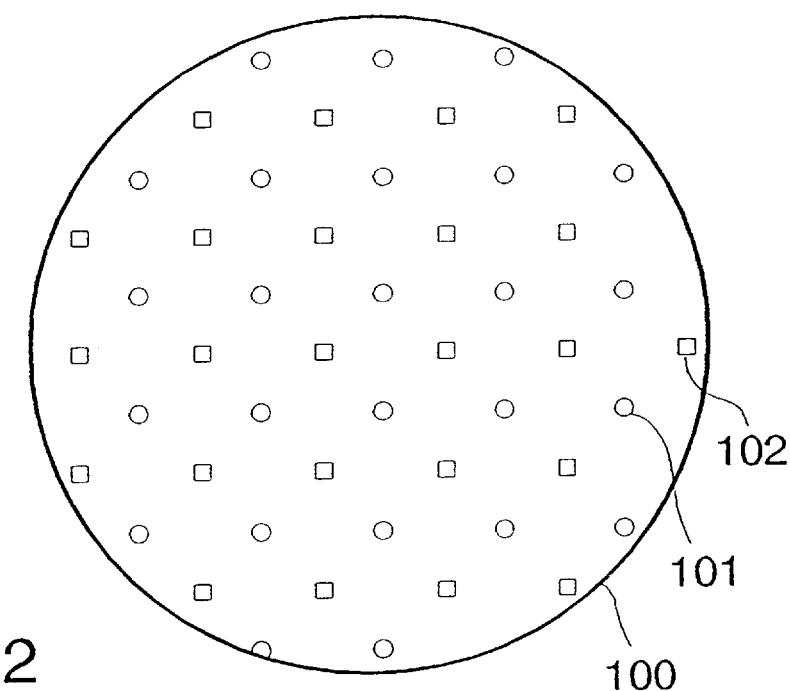
FIG. 2 shows two kinds of optical markers disposed to the two windows as seen through the microscope, whereby the markers are not overlapping each other.

FIG. 2 shows, as an example, two kinds of optical markers that are disposed to the two windows of sample container 1 as seen through the microscope 100. In this case, circle-shaped markers 101 are disposed to the first window 2, and square-shaped markers 102 are disposed to the second window 3. The markers are not overlapping each other.

Figure 3:
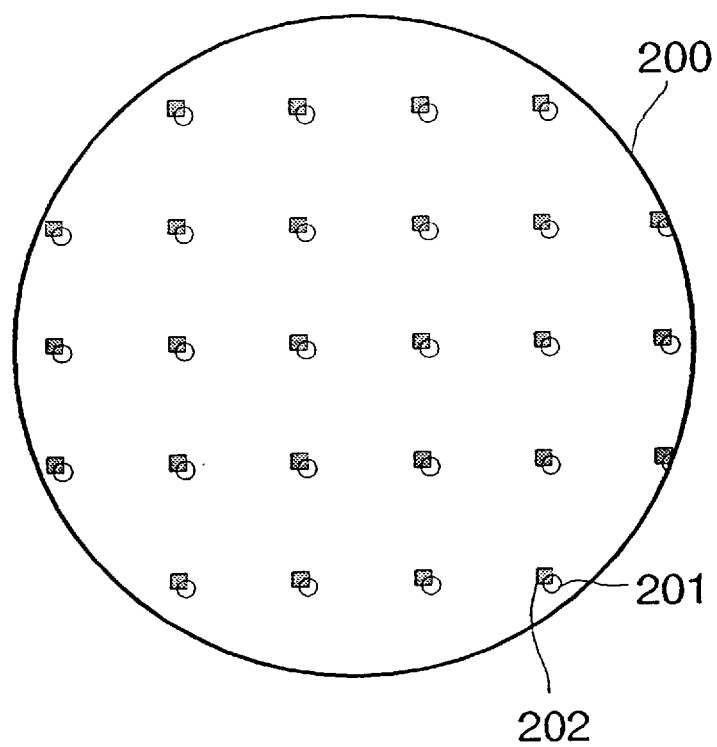
FIG. 3 shows two kinds of optical markers disposed to the two windows as seen through the microscope, whereby the markers are overlapping each other.

FIG. 3 shows two kinds of optical markers disposed to the two windows as seen through the microscope 200, whereby the markers are overlapping each other. In this case, an open circle 201 acts as the first marker, and a filled square 202 acts as the second marker. This allows one to design a software that can separate the two kinds of markers even if they are overlapping.

Figure 4:
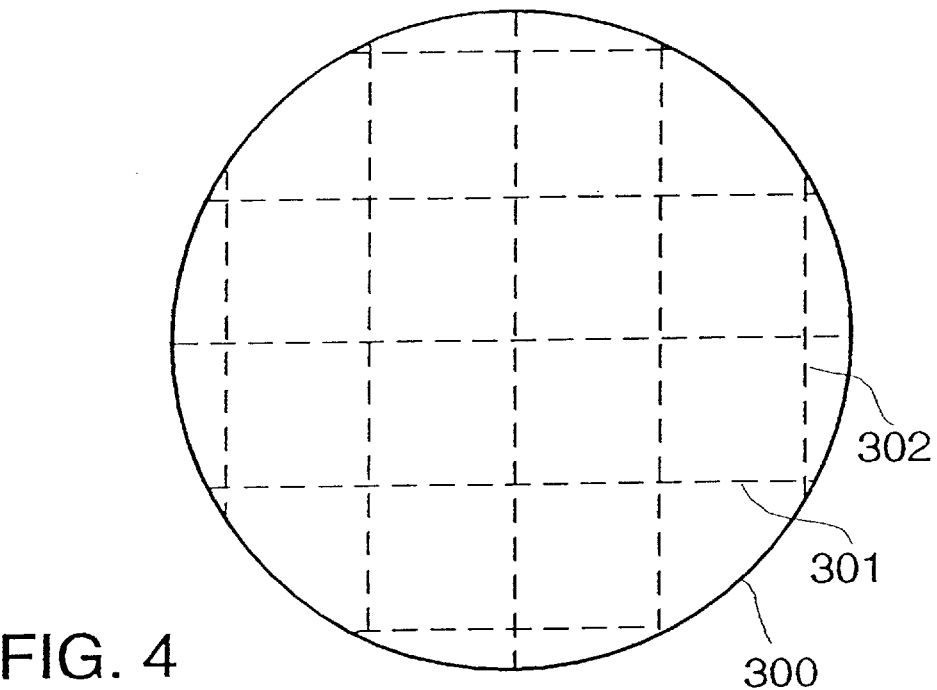
FIG. 4 depicts optical markers in the form of dashed lines.

FIG. 4 depicts optical markers in the form of dashed lines as seen through the microscope 300. Lines 301 oriented in "west-east" direction are disposed to the first window 2 of the sample container 1, and lines 302 oriented in "north-south" direction are disposed to the second window 3 of sample container 1.

Figure 5:
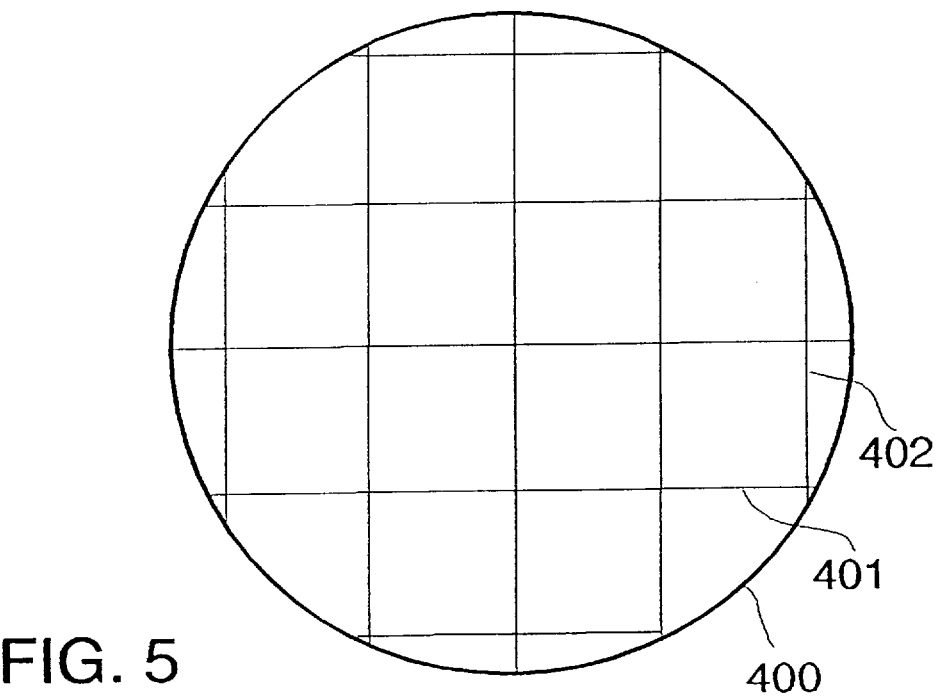
FIG. 5 depicts optical markers in the form of thin solid lines.

FIG. 5 depicts optical markers in the form of solid lines as seen through the microscope 400. Lines 401 oriented in "west-east" direction are disposed to the first window 2 of the sample container 1, and lines 402 oriented in "north-south" direction are disposed to the second window 3 of sample container 1.

As illustrated in FIG. 1, sample container 1 is loaded onto the sample stage 5 of an optical microscope 8. Sample stage 5 is controlled in X, Y and Z direction via a stage controller unit 6 by a systems computer 7. The X, Y and Z directions are set forth in FIG. 1. In the area of microscopy, the Z-direction always means movement in the vertical direction. In order to allow for absorbance measurement within the sample, microscope 8 is equipped with a light source 9. This source can also be used if absorptive or scattering markers are employed. The sample within sample container 1 can also be illuminated in epi configuration using a second light source 10 in conjunction with a beam splitter 11. Light source 10 is also employed if reflective markers are used.

A preferred embodiment of an apparatus according to the present invention also comprises an imaging receiver 12 such as a charge-coupled device (CCD camera), which is connected to an image processor 13 and systems computer 7. The functional group of receiver 12, image processor 13, computer 7 and stage controller 6 allows one to run a pattern recognition program after a sample has been loaded onto stage 5. This group also allows one to run an auto-focus program, after a particular marker has been identified.

In operation, an optical sample is deposited into sample container 1. Then sample container 1, which is on stage 5, is moved by stage controller 6 in X and Y direction until one of the first optical markers is identified and located within the field of view, preferably close to the center. In a next step, sample container 1 which is attached to stage 5 is then moved in Z direction until the first optical marker is exactly in-focus. After this is achieved, the first in-focus position is recorded in the computer. Next, sample container 1 is moved by stage controller 6 in X and Y direction until one of the second optical markers is identified and located within the field of view, preferably close to the center. Again, sample container 1 is moved by stage controller 6 until the second optical marker is exactly in-focus, and the second in-focus position is recorded.

Finally, the difference between the first and the second in-focus positions is calculated. This value can then be used to determine the sample thickness by taking into account the optical index of refraction of the sample. In most practical cases, the effect that sample concentration has on the optical index of refraction can be neglected.

Combining the steps of marker deposition, marker identification via pattern recognition, and auto-focusing onto the two kinds of optical markers according to the present invention provides a means to automate the process of sample thickness determination. Moreover, this method allows for determining the sample thickness in a region that is almost identical with the region where an absorbance measurement is performed on a thin and small sample. Consequently, a precise concentration measurement can be performed. For example, preliminary feasibility experiments have revealed that the thickness of a 200-$\mu$m thick liquid can be determined with an accuracy of ±0.05 $\mu$m.

The method and apparatus according to the present invention can be utilized for determining the thickness of liquid samples, as well as gel samples, and gaseous or vapor samples. However, the method and apparatus of the present invention are not intended to be limited to such samples.

The method and apparatus of the present invention can also be applied to solid optically transparent samples having at least two, or more than two polished surfaces. In this aspect of the present invention, no sample container is required because the solid sample can be attached or placed directly onto a microscope slide. Also, the optical markers would be deposited directly on the two or more than two sample surfaces of interest. Therefore, this aspect of the present invention more particularly relates to a method for precisely determining the thickness of transparent solid optical samples at the time an absorbance measurement or other spectroscopic measurements are performed on the sample(s), utilizing an apparatus as broadly described above comprising:

a) providing a microscope slide;

b) depositing onto the slide a transparent solid optical sample having a first surface and a second surface, whereby the first surface has first optical markers, and the second surface has second optical markers;

c) loading the microscope slide onto an optical microscope;

d) moving the microscope slide until one of the first optical markers is identified and located within the field of view, and then moving the sample until the first optical marker is exactly in-focus, and recording the first in-focus position;

e) then moving the microscope slide until one of the second optical markers is identified and located within the field of view, and moving the sample until the second optical marker is exactly in-focus, and recording the second in-focus position;

f) calculating the difference between the first and the second in-focus positions; and g) determining the thickness of the optical solid sample.

Thus, using the method and apparatus according to the present invention would allow one to not only determine the absolute sample thickness with high accuracy, but also to determine how parallel the sample surfaces are. No matter if liquid, gel, vapor, or solid samples are measured, there is no limit in regard to the sample thickness, if an appropriate objective lens is used in the microscope.

In one embodiment of the invention, computer-controlled stage and sample movement has been described. However, it also is within the spirit of the present invention to move the sample manually in X, Y, and Z direction and to perform visual observations in regard to the kind of optical marker found therein and in regard to the in-focus positioning.

I claim:

1. An apparatus for precisely determining the thickness of optical samples at the time an absorbance measurement or other spectroscopic measurements are performed on said sample(s), wherein said apparatus is an optical microscope comprising:

a means for containing a sample wherein said means has first and second optical markers;

a means for holding said means for containing a sample;

a means for illuminating the sample in said means for containing a sample;

a means for automatically focusing on first and second optical markers in said means for containing a sample; and a means for performing a pattern recognition procedure for said optical samples, wherein said means comprises an imaging receiver which is connected to an image processor and a computer.

2. The apparatus of claim 1 wherein said means for containing a sample is a sample container comprising a first and a second optically transparent window, each of these windows having an outer surface and an inner surface, and further wherein the inner surface of the first window has said first optical markers, and the inner surface of the second window has said second optical markers.

3. The apparatus of claim 2 wherein, in said sample container, said first optical markers are evenly distributed across the whole inner surface of the first window, and said second optical markers are evenly distributed across the whole inner surface of the second window.

4. The apparatus of claim 1 wherein said means for illuminating the sample is a light source wherein said light source is a first light source.

5. The apparatus of claim 1 wherein said means for illuminating the sample is a second light source in conjunction with a beam splitter.

6. The apparatus of claim 1 wherein said sample is a liquid sample.

7. The apparatus of claim 1 wherein said sample is a gel sample.

8. The apparatus of claim 1 wherein said sample is a gaseous or vapor sample.

9. The apparatus of claim 1 wherein said means for containing a sample is a microscope slide for a solid sample, said sample having a first and a second surface, and further wherein the first surface of said sample has said first optical markers, and the second surface of said sample has said second optical markers.

10. The apparatus of claim 9 wherein said first optical markers are evenly distributed across the first surface of the solid sample, and said second optical markers are evenly distributed across the second surface of the solid sample.

* * * * *